United States Patent
Ioffe et al.

(10) Patent No.: US 9,288,484 B1
(45) Date of Patent: Mar. 15, 2016

(54) SPARSE CODING DICTIONARY PRIMING

(75) Inventors: Sergey Ioffe, Mountain View, CA (US); Pascal Massimino, Orsay (FR)

(73) Assignee: GOOGLE INC., Mountain View, CA (US)

(*) Notice: Subject to any disclaimer, the term of this patent is extended or adjusted under 35 U.S.C. 154(b) by 836 days.

(21) Appl. No.: 13/598,682

(22) Filed: Aug. 30, 2012

(51) Int. Cl.
*H04N 19/00* (2014.01)

(52) U.S. Cl.
CPC ..................................... *H04N 19/00* (2013.01)

(58) Field of Classification Search
CPC ....................................................... H04N 19/00
USPC ....................................................... 375/240.1
See application file for complete search history.

(56) References Cited

U.S. PATENT DOCUMENTS

| | | | |
|---|---|---|---|
| 4,924,310 A | 5/1990 | von Brandt | |
| 5,148,269 A | 9/1992 | de Haan et al. | |
| 5,337,086 A | 8/1994 | Fujinami | |
| 5,398,068 A | 3/1995 | Liu et al. | |
| 5,512,952 A | 4/1996 | Iwamura | |
| 5,701,160 A | 12/1997 | Kimura et al. | |
| 5,731,840 A | 3/1998 | Kikuchi et al. | |
| 5,883,975 A * | 3/1999 | Narita et al. | 382/232 |
| 5,886,742 A | 3/1999 | Hibi et al. | |
| 5,929,919 A | 7/1999 | De Haan et al. | |
| 5,991,447 A | 11/1999 | Eifrig et al. | |
| 6,005,980 A | 12/1999 | Eifrig et al. | |
| 6,058,141 A | 5/2000 | Barger et al. | |
| 6,272,179 B1 | 8/2001 | Kadono | |
| 6,289,049 B1 | 9/2001 | Kim et al. | |
| 6,359,929 B1 | 3/2002 | Boon | |
| 6,381,277 B1 | 4/2002 | Chun et al. | |
| 6,385,245 B1 | 5/2002 | De Haan et al. | |
| 6,449,312 B1 | 9/2002 | Zhang et al. | |
| 6,711,211 B1 | 3/2004 | Lainema | |

(Continued)

FOREIGN PATENT DOCUMENTS

| | | |
|---|---|---|
| EP | 0634873 | 9/1998 |
| EP | 1876823 | 1/2008 |

OTHER PUBLICATIONS

Chen, Michael C., et al.; "Design and Optimization of a Differentially Coded Variable Block Size Motion Compensation System", IEEE 1996, 4 pp.

(Continued)

*Primary Examiner* — Sath V Perungavoor
*Assistant Examiner* — Jeffrey Williams
(74) *Attorney, Agent, or Firm* — Young Basile Hanlon & MacFarlane P.C.

(57) ABSTRACT

A method and apparatus for performing sparse coding dictionary priming are disclosed. Sparse coding dictionary priming may include iteratively training a coding dictionary, which may include a plurality of codewords or bases. Iteratively training the coding dictionary may include identifying a sampling index cardinality, identifying a portion of a video stream, decomposing the portion of the video stream, and updating the codeword based on the portion of the video stream. Decomposing the portion of the video stream may include randomly identifying a set of codewords from the plurality of codewords wherein a cardinality of the set of codewords is the sampling index cardinality and wherein the sampling index cardinality is less a cardinality of the plurality of codewords, and determining a codeword having a maximum correlation with the portion of the video stream from the set of codewords.

20 Claims, 5 Drawing Sheets

(56) References Cited

U.S. PATENT DOCUMENTS

| | | | |
|---|---|---|---|
| 6,735,249 | B1 | 5/2004 | Karczewicz et al. |
| 6,839,386 | B2 | 1/2005 | Sato et al. |
| 6,927,804 | B2 | 8/2005 | Adams, Jr. et al. |
| 6,956,898 | B1 | 10/2005 | Podilchuk et al. |
| 7,003,174 | B2 | 2/2006 | Kryukov et al. |
| 7,054,367 | B2 | 5/2006 | Oguz et al. |
| 7,084,906 | B2 | 8/2006 | Adams, Jr. et al. |
| 7,133,070 | B2 | 11/2006 | Wheeler et al. |
| 7,158,668 | B2 | 1/2007 | Munsil et al. |
| 7,346,109 | B2 | 3/2008 | Nair et al. |
| 7,474,355 | B2 | 1/2009 | Leone et al. |
| 7,483,577 | B2 | 1/2009 | Xin et al. |
| 7,671,922 | B2 | 3/2010 | Leone et al. |
| 7,724,307 | B2 | 5/2010 | Wan et al. |
| 7,978,770 | B2 | 7/2011 | Luo et al. |
| 8,023,749 | B2 | 9/2011 | Nakayama |
| 8,111,754 | B1 | 2/2012 | Demos |
| 8,184,200 | B1 | 5/2012 | Biswas et al. |
| 8,335,105 | B2 | 12/2012 | Wang et al. |
| 8,422,546 | B2 | 4/2013 | Lin et al. |
| 8,593,692 | B2 | 11/2013 | Chen et al. |
| 8,908,984 | B2 | 12/2014 | Carmel et al. |
| 2002/0031272 | A1 | 3/2002 | Bagni et al. |
| 2003/0012280 | A1 | 1/2003 | Chan |
| 2003/0053708 | A1 | 3/2003 | Kryukov et al. |
| 2003/0086498 | A1 | 5/2003 | Lee et al. |
| 2003/0128762 | A1 | 7/2003 | Nakagawa et al. |
| 2004/0022419 | A1 | 2/2004 | Kesaniemi |
| 2004/0071313 | A1 | 4/2004 | Hahn et al. |
| 2004/0227758 | A1 | 11/2004 | Curry et al. |
| 2006/0045184 | A1 | 3/2006 | Vetro et al. |
| 2006/0072672 | A1* | 4/2006 | Holcomb et al. ......... 375/240.25 |
| 2006/0209963 | A1* | 9/2006 | Valente .................... 375/240.24 |
| 2006/0242581 | A1 | 10/2006 | Manion et al. |
| 2007/0019729 | A1 | 1/2007 | Nakagomi et al. |
| 2007/0076959 | A1 | 4/2007 | Bressan |
| 2007/0292036 | A1 | 12/2007 | Nakayama |
| 2008/0008243 | A1 | 1/2008 | Ozdemir |
| 2008/0170623 | A1* | 7/2008 | Aharon et al. ........... 375/240.22 |
| 2008/0285656 | A1 | 11/2008 | Au et al. |
| 2009/0167778 | A1 | 7/2009 | Wei |
| 2010/0053451 | A1 | 3/2010 | Seong et al. |
| 2010/0091194 | A1 | 4/2010 | Lei et al. |
| 2010/0177239 | A1 | 7/2010 | Servais et al. |
| 2010/0283892 | A1 | 11/2010 | Zhou et al. |
| 2010/0289816 | A1 | 11/2010 | Au et al. |
| 2010/0315550 | A1 | 12/2010 | Yokoyama |
| 2011/0007979 | A1 | 1/2011 | Goma |
| 2011/0069237 | A1 | 3/2011 | Wang et al. |
| 2012/0063681 | A1 | 3/2012 | Sandrew et al. |
| 2012/0154370 | A1 | 6/2012 | Russell et al. |
| 2013/0022119 | A1 | 1/2013 | Chien et al. |
| 2013/0170767 | A1* | 7/2013 | Choudhury et al. .......... 382/260 |
| 2013/0198152 | A1* | 8/2013 | McGhee et al. .............. 707/693 |
| 2013/0223733 | A1 | 8/2013 | Tripathi et al. |
| 2013/0257851 | A1 | 10/2013 | Lee et al. |

OTHER PUBLICATIONS

Chen, Xing C., et al.; "Quadtree Based Adaptive Lossy Coding of Motion Vectors", IEEE 1996, 4 pp.
Dalal et al., "Histograms of oriented gradients for human detection", Computer vision and Pattern Recognition, vol. 1, pp. 886-893, Jun. 25, 2005.
Ebrahimi, Touradj, et al.; "Joint motion estimation and segmentation for very low bitrate video coding", SPIE vol. 2501, 1995, 12 pp.
Fang et al., "A New Adaptive Subpixel-based Downsampling Scheme Using Edge Detection", pp. 3194-3197, ISCAS, 14-27, 2009.
Guillotel, Philippe, et al.; "Comparison of motion vector coding techniques", SPIE vol. 2308, 1994, 11 pp.
ISR for related application PCT/US2014/032207 mailed Jul. 7, 2014 (894APCT).
Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Krishnamurthy et al. Frame Interpolation and Bidirectional Prediction of Video Using Compactly Encoded Optical-Flow Fields and Label Fields, IEEE Transactions on Circuits and Systems for video Technology, vol. 9, No. 5, Aug. 1, 1999.
Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 10 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Ojo et al., "Robust Motion-Compensated Video Upconversation" IEEE Transactions on Consumer Electronics, vol. 43, No. 4, Nov. 1, 1997, pp. 1045-1056.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Wiegand, Thomas, et al.; "Long-Term Memory Motion-Compensated Prediction", Publication Unknown, Date Unknown, 15 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wikipedia contributors, "Chroma subsampling", webpage, last updated Jun. 3, 2014, pp. 1-8, http://en.wikipedia.org/wiki/Chroma_subsampling.
Wright, R. Glenn, et al.; "Multimedia—Electronic Technical Manual for ATE", IEEE 1996, 3 pp.
Zhang, Kui, et al.; "Variable Block Size Video Coding With Motion Prediction and Motion Segmentation", SPIE vol. 2419, 1995, 9 pp.
"Series H: Audiovisual and Multimedia Systems; Infrastructure of audiovisual services—Coding of moving video; Advanced video coding for generic audiovisual services". H.264. Version 1. International Telecommunication Union. Dated May 2003.

(56) References Cited

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, An Open Source Video CODEC for the Web". Dated Jul. 11, 2011.
Bankoski, J., Koleszar, J., Quillio, L., Salonen, J., Wilkins, P., and Y. Xu, "VP8 Data Format and Decoding Guide", RFC 6386, Nov. 2011.
Mozilla, "Introduction to Video Coding Part 1: Transform Coding", Video Compression Overview, Mar. 2012, 171 pp.
Le, Sung-Hee, Ohjae Kwon, and Rae-Hong Park. Weighted-adaptive motion-compensated frame rate up-conversion. Consumer Electronics, IEEE Transactions on 49.3 (2003): 485-592.
Xu, Li, Jianing Chen, and Jiaya Jia. A segmentation based variational model for accurate optical flow estimation. Computer Vision-ECCV 2008. Springer Berlin Heidelberg, 2008. 671-684.

\* cited by examiner

SPARSE CODING DICTIONARY PRIMING

TECHNICAL FIELD

This application relates to video coding such as video coding using a coding dictionary.

BACKGROUND

Digital video can be used, for example, for remote business meetings via video conferencing, high definition video entertainment, video advertisements, or sharing of user-generated videos. Accordingly, it is advantageous to provide high resolution video transmitted over communications channels having limited bandwidth.

SUMMARY

Disclosed herein are aspects of systems, methods, and apparatuses for performing sparse coding dictionary priming.

An aspect is a method for performing sparse coding dictionary priming. Sparse coding dictionary priming may include iteratively training a coding dictionary, which may include a plurality of codewords or bases. Iteratively training the coding dictionary may include identifying a sampling index cardinality, identifying a portion of a video stream, decomposing the portion of the video stream, and updating the codeword based on the portion of the video stream. Decomposing the portion of the video stream may include randomly identifying a set of codewords from the plurality of codewords wherein a cardinality of the set of codewords is the sampling index cardinality and wherein the sampling index cardinality is less than a cardinality of the plurality of codewords, and determining a codeword having a maximum correlation with the portion of the video stream from the set of codewords.

Another aspect is an apparatus for sparse coding dictionary priming. The apparatus includes a memory and at least one processor. The at least one processor is configured to execute instructions stored in the memory to iteratively train a coding dictionary, which may include a plurality of codewords or bases. Iteratively training the coding dictionary may include identifying a sampling index cardinality, identifying a portion of a video stream, decomposing the portion of the video stream, and updating the codeword based on the portion of the video stream. Decomposing the portion of the video stream may include randomly identifying a set of codewords from the plurality of codewords wherein a cardinality of the set of codewords is the sampling index cardinality and wherein the sampling index cardinality is less than a cardinality of the plurality of codewords, and determining a codeword having a maximum correlation with the portion of the video stream from the set of codewords.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

The generation and display of a video signal, such as high quality digital video communicated using a limited bandwidth medium, may use one or more video compression schemes as part of the encoding and decoding of the video signals. According to the implementations herein, video compression can include sparse coding. Sparse coding can improve video encoding and decoding efficiency by encoding a portion of a video stream or image, such as a number of pixels in close proximity to a target pixel, as a function of a set (dictionary) of values (codewords or bases) shared by an encoder and a decoder. For example, a dictionary may include multiple codewords, such as 1000 codewords, and each codeword may indicate an image feature, such as alternating bands of light and dark or a left to right gradient from light to dark.

A dictionary may be trained, or primed. Iterative training can include at step where each training data point is first decomposed into a sparse combination of dictionary words. Such techniques can be highly sensitive to initialization such that some codewords may not be selected. According to the teachings herein, sparse coding dictionary priming may occur to improve the efficiency of the sparse coding method by training a dictionary to increase the number of codewords selected that can be used in the encoding and decoding process. In an implementation, each codeword is used.

Initially, the use of sparse coding dictionary priming as described herein is described with reference to an exemplary environment in which it can be incorporated. For simplicity, aspects of this disclosure are described herein with reference to encoding and decoding portions of a video stream or image, which may be referred to as examples or image patches, as two-dimensional fixed size vectors of values, such as pixel values; however, the aspects, embodiments, and implementations described herein may be applied to encoding and decoding portions having other dimensions. For example, the teachings herein may be used for four-dimensional portions, such as examples of a video stream including three color channels and a time element.

Figure 1:
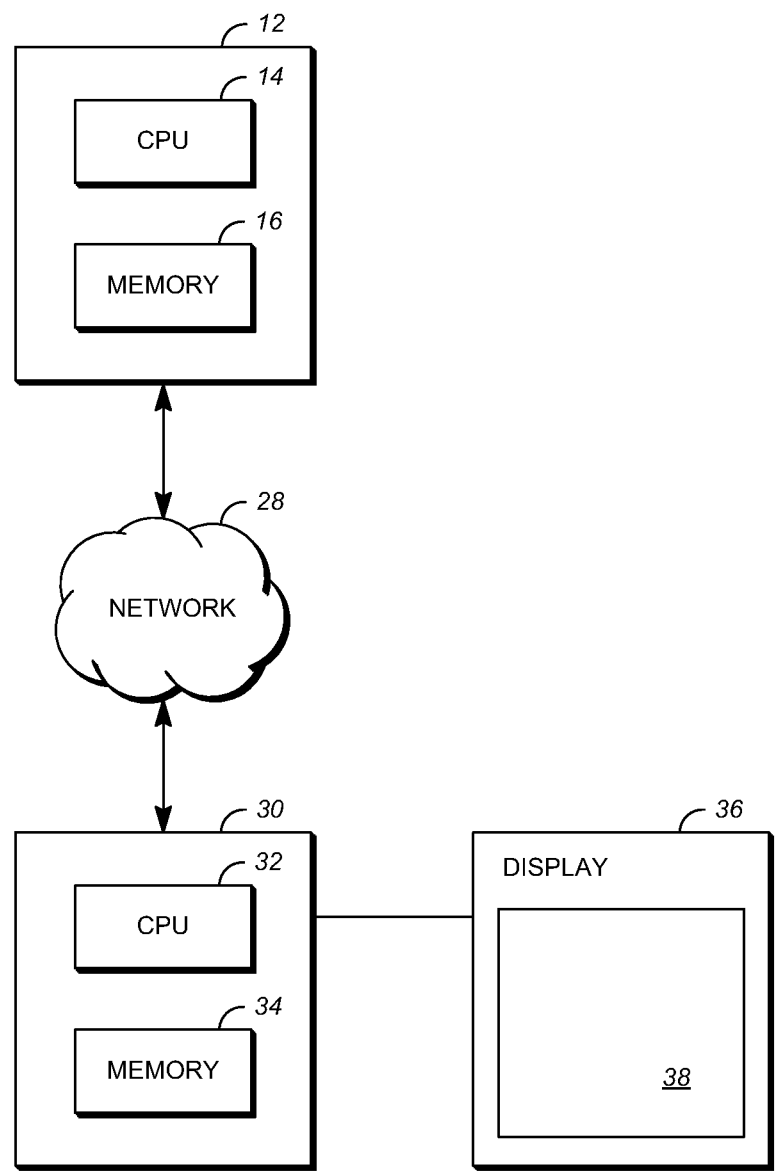
FIG. 1 is a diagram of a video encoding and decoding system in accordance with an implementation of this disclosure.

FIG. 1 is a diagram of a video encoding and decoding system 10 in accordance with an implementation of this disclosure. A transmitting station 12 can be, for example, a computing device having an internal configuration of hardware including a processor such as a central processing unit (CPU) 14 and a memory 16. CPU 14 may be a controller for controlling the operations of transmitting station 12. CPU 14 can be connected to memory 16 by, for example, a memory bus. Memory 16 can be read only memory (ROM), random access memory (RAM), or any other suitable memory device. Memory 16 can store data and program instructions that can be used by CPU 14. Other suitable implementations of transmitting station 12 are possible. As used herein, the term "computing device" includes a server, a hand-held device, a laptop computer, a desktop computer, a special purpose computer, a general purpose computer, or any device, or combination of devices, capable of performing any method, or any portion thereof, disclosed herein.

A network 28 can connect transmitting station 12 and a receiving station 30 for encoding and subsequently decoding the video stream. Specifically, the video stream can be encoded in transmitting station 12 and the encoded video stream can be decoded in receiving station 30. Network 28 can, for example, be the Internet. Network 28 can also be a local area network (LAN), wide area network (WAN), virtual private network (VPN), a mobile or cellular telephone network, or any other means of transferring the video stream from transmitting station 12 to, in this example, receiving station 30.

Receiving station 30, in one example, can be a computing device having an internal configuration of hardware including a processor such as a CPU 32 and a memory 34. CPU 32 may be a controller for controlling the operations of receiving station 30. CPU 32 can be connected to the memory 34 by, for example, a memory bus. Memory 34 can be ROM, RAM or any other suitable memory device. Memory 34 can store data and program instructions that can be used by CPU 32. Other suitable implementations of receiving station 30 are possible. For example, the processing of receiving station 30 can be distributed among multiple devices.

A display 36 configured to display a video stream can be connected to receiving station 30. Display 36 can be implemented in various ways, including by a liquid crystal display (LCD), a cathode-ray tube (CRT), or a light emitting diode display (LED), such as an OLED display. Display 36 can be coupled to CPU 32 and can be configured to display a rendering 38 of the video stream decoded by a decoder in receiving station 30.

Other implementations of encoder and decoder system 10 are possible. In some of the implementations described, for example, an encoder is in transmitting station 12 and a decoder is in receiving station 30 as instructions in memory or a component separate from memory. However, an encoder or decoder can be coupled to a respective station 12, 30 rather than in it. Further, one implementation can omit network 28 and/or display 36. In another implementation, a video stream can be encoded and then stored for transmission at a later time to receiving station 30 or any other device having memory. In one implementation, a video stream is received by receiving station 30 (e.g., via network 28, a computer bus and/or some communication pathway) and stored for later decoding. In another implementation, additional components can be added to encoder and decoder system 10. For example, a display or a video camera can be attached to transmitting station 12 to capture the video stream to be encoded. In an exemplary implementation, a real-time transport protocol (RTP) is used for transmission of the encoded video. In another implementation, a transport protocol other than RTP may be used, e.g., a Hyper Text Transport Protocol (HTTP)-based video streaming protocol.

Figure 2:
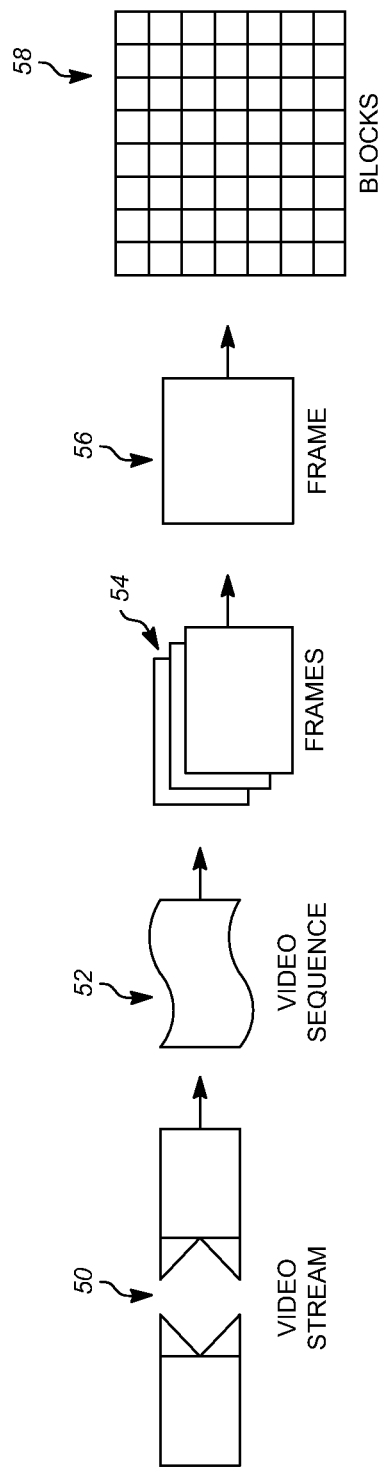
FIG. 2 is a diagram of a typical video stream for encoding and decoding in accordance with an implementation of this disclosure.

FIG. 2 is a diagram of a video stream 50 for encoding and decoding in accordance with an implementation of this disclosure. Video stream 50 includes a video sequence 52. At the next level, video sequence 52 includes a number of adjacent frames 54. While three frames are depicted in adjacent frames 54, video sequence 52 can include any number of adjacent frames. Adjacent frames 54 can then be further subdivided into individual frames, e.g., a single frame 56. At the next level, single frame 56 can be divided into a series of blocks 58 that may include pixels. For example, a block can include a 16×16 group of pixels, an 8×8 group of pixels, an 8×16 group of pixels, or any other group of pixels. Unless otherwise indicated herein, the term block can include a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 3:
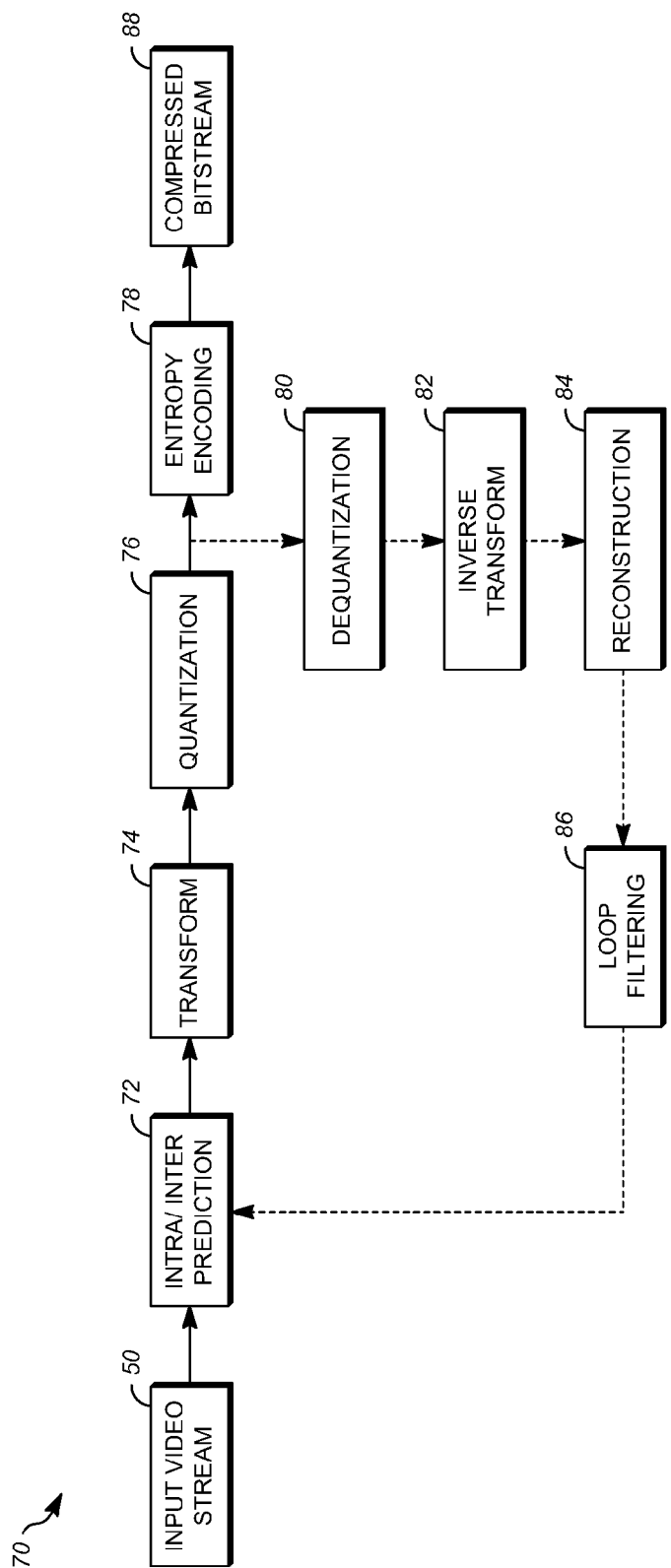
FIG. 3 is a block diagram of a video compression device in accordance with an implementation of this disclosure.

FIG. 3 is a block diagram of an encoder 70 in accordance with an implementation of this disclosure. Encoder 70 can be implemented, as described above, in transmitting station 12 as a computer software program stored in memory 16, for example. The computer software program can include machine instructions that, when executed by CPU 14, cause transmitting station 12 to encode video data in the manner described in FIG. 3. Encoder 70 can be implemented as specialized hardware included, for example, in transmitting station 12. Encoder 70 has the following stages to perform the various functions in a forward path (shown by the solid connection lines) to produce an encoded or a compressed bitstream 88 using input video stream 50: an intra/inter prediction stage 72, a transform stage 74, a quantization stage 76, and an entropy encoding stage 78. Encoder 70 may also include a reconstruction path (shown by the dotted connection lines) to reconstruct a frame for encoding of future blocks. In FIG. 3, encoder 70 has the following stages to perform the various functions in the reconstruction path: a dequantization stage 80, an inverse transform stage 82, a reconstruction stage 84, and a loop filtering stage 86. Other structural variations of encoder 70 can be used to encode video stream 50.

When video stream 50 is presented for encoding, each frame 56 within the video stream 50 can be processed in units of blocks. At intra/inter prediction stage 72, each block may be encoded using either intra-frame prediction (within a single frame) or inter-frame prediction (frame to frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at intra/inter prediction stage 72 to produce a residual block (also called a residual). Transform stage 74 transforms the residual into transform coefficients in, for example, the frequency domain. Examples of block-based transforms include the Karhunen-Loève Transform (KLT), the Discrete Cosine Transform (DCT), and the Singular Value Decomposition Transform (SVD). In one example, the DCT transforms the block into the frequency domain. In the case of DCT, the transform coefficient values may be based on spatial frequency, with the lowest frequency (i.e., DC) coefficient at the top-left of the matrix and the highest frequency coefficient at the bottom-right of the matrix.

Quantization stage 76 converts the transform coefficients into discrete quantum values, which may be referred to as quantized transform coefficients, using a quantizer value or a quantization level. The quantized transform coefficients are then entropy encoded by entropy encoding stage 78. Entropy encoding can include using a probability distribution metric. The entropy-encoded coefficients, together with other information used to decode the block, which may include the type of prediction used, motion vectors and quantizer value, are then output to compressed bitstream 88. Compressed bitstream 88 can be formatted using various techniques, such as variable length encoding (VLC) and arithmetic coding. Compressed bitstream 88 can also be referred to as an encoded video stream and the terms will be used interchangeably herein.

The reconstruction path in FIG. 3 (shown by the dotted connection lines) can be used to ensure that both encoder 70 and a decoder 100 (described below) use the same reference frames to decode compressed bitstream 88. The reconstruction path can perform functions that are similar to functions that take place during the decoding process that are discussed in more detail below, including dequantizing the quantized transform coefficients at dequantization stage 80 and inverse transforming the dequantized transform coefficients at inverse transform stage 82 to produce a derivative residual block (also called a derivative residual). At reconstruction stage 84, the prediction block that was predicted at intra/inter prediction stage 72 can be added to the derivative residual to create a reconstructed block. Loop filtering stage 86 can be applied to the reconstructed block to reduce distortion such as blocking artifacts.

Other variations of encoder 70 can be used to encode compressed bitstream 88. For example, a non-transform based encoder 70 can quantize the residual block directly without transform stage 74. In another implementation, an encoder 70 can have quantization stage 76 and dequantization stage 80 combined into a single stage.

Figure 4:
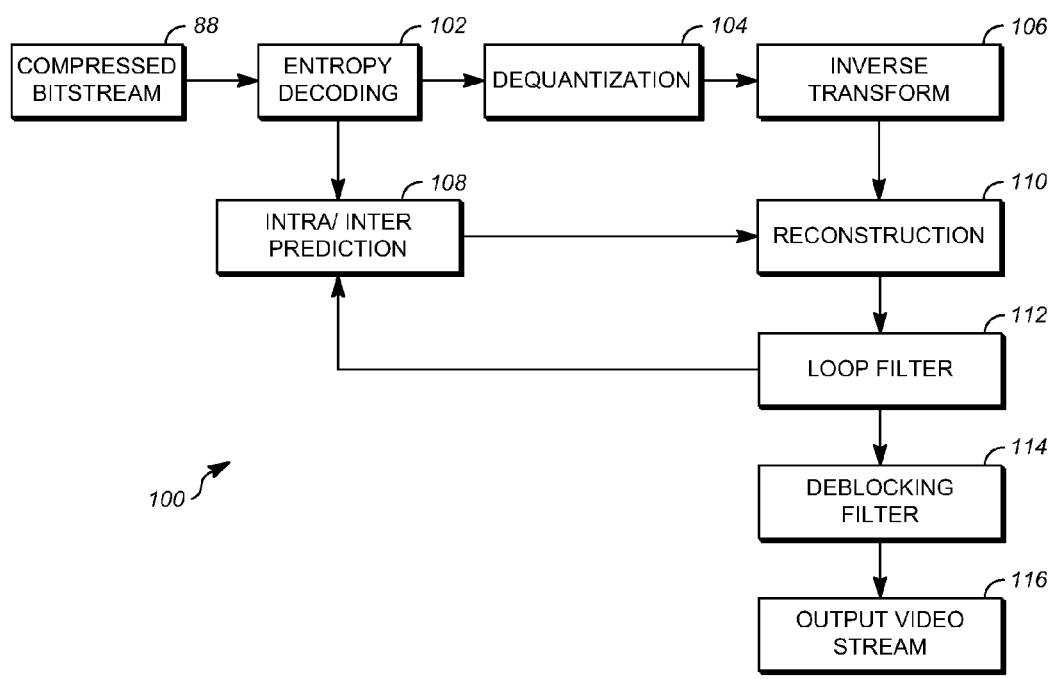
FIG. 4 is a block diagram of a video decompression device in accordance with an implementation of this disclosure.

FIG. 4 is a block diagram of a decoder 100 in accordance with an implementation of this disclosure. Decoder 100 can be implemented in a device, such as receiving station 30 described above, for example, using a computer software program stored in memory 34. The computer software program can include machine instructions that, when executed by CPU 32, cause receiving station 30 to decode video data in the manner described in FIG. 4. Decoder 100 can also be implemented as specialized hardware included, for example, in transmitting station 12 or receiving station 30.

Decoder 100, similar to the reconstruction path of encoder 70 discussed above, includes in one example the following stages to perform various functions to produce an output video stream 116 from compressed bitstream 88: an entropy decoding stage 102, a dequantization stage 104, an inverse transform stage 106, an intra/inter prediction stage 108, a reconstruction stage 110, a loop filtering stage 112 and a deblocking filtering stage 114. Other structural variations of decoder 100 can be used to decode compressed bitstream 88.

When compressed bitstream 88 is presented for decoding, the data elements within compressed bitstream 88 can be decoded by entropy decoding stage 102 (using, for example, arithmetic coding) to produce a set of quantized transform coefficients. Dequantization stage 104 dequantizes the quantized transform coefficients, and inverse transform stage 106 inverse transforms the dequantized transform coefficients to produce a derivative residual that can be identical to that created by the inverse transform stage 82 in encoder 70. Using header information decoded from compressed bitstream 88, decoder 100 can use intra/inter prediction stage 108 to create the same prediction block as was created in encoder 70, e.g., at intra/inter prediction state 72. At reconstruction stage 110, the prediction block can be added to the derivative residual to create a reconstructed block. Loop filtering stage 112 can be applied to the reconstructed block to reduce blocking artifacts. Deblocking filtering stage 114 can be applied to the reconstructed block to reduce blocking distortion, and the result is output as output video stream 116. Output video stream 116 can also be referred to as a decoded video stream, and the terms will be used interchangeably herein.

Other variations of decoder 100 can be used to decode compressed bitstream 88. For example, decoder 100 can produce output video stream 116 without deblocking filtering stage 114.

As mentioned briefly above, sparse coding dictionary priming may be performed to improve the accuracy and efficiency of encoding and decoding using a dictionary of codewords. According to one example, in initial stages of the priming, one of the codewords can be stochastically determined based on its rank, where the rank is based on how well the codeword fits a video stream portion. For example, a selection of rank-1 can indicate a desire to use a conventional, e.g., so-called greedy, training method. An alternative is to sample based on the rank, progressively placing more weight on the rank-1 item.

This can be accomplished in general by randomly sampling K indices and selecting the best one. As the iterations progress, K may be increased, eventually letting it become the dictionary size. At this point, a greedy method is achieved. By varying K from a small value (e.g., 2) towards the maximum (e.g., the dictionary size), the codewords selected are used by large fractions of the training data, instead of falling in a local minimum where they are used by none or one items.

According to one implementation, the following algorithm may be implemented for sparse coding dictionary priming:
For t=1, 2, . . . .
Choose K as function of t
Select a training example
Compute the decomposition of the training example, where the best match out of a random sample of size K is chosen at each step of the decomposition algorithm (e.g., a greedy method or algorithm such as matching pursuit or orthogonal matching pursuit)
Update the dictionary
End for.

Figure 5:
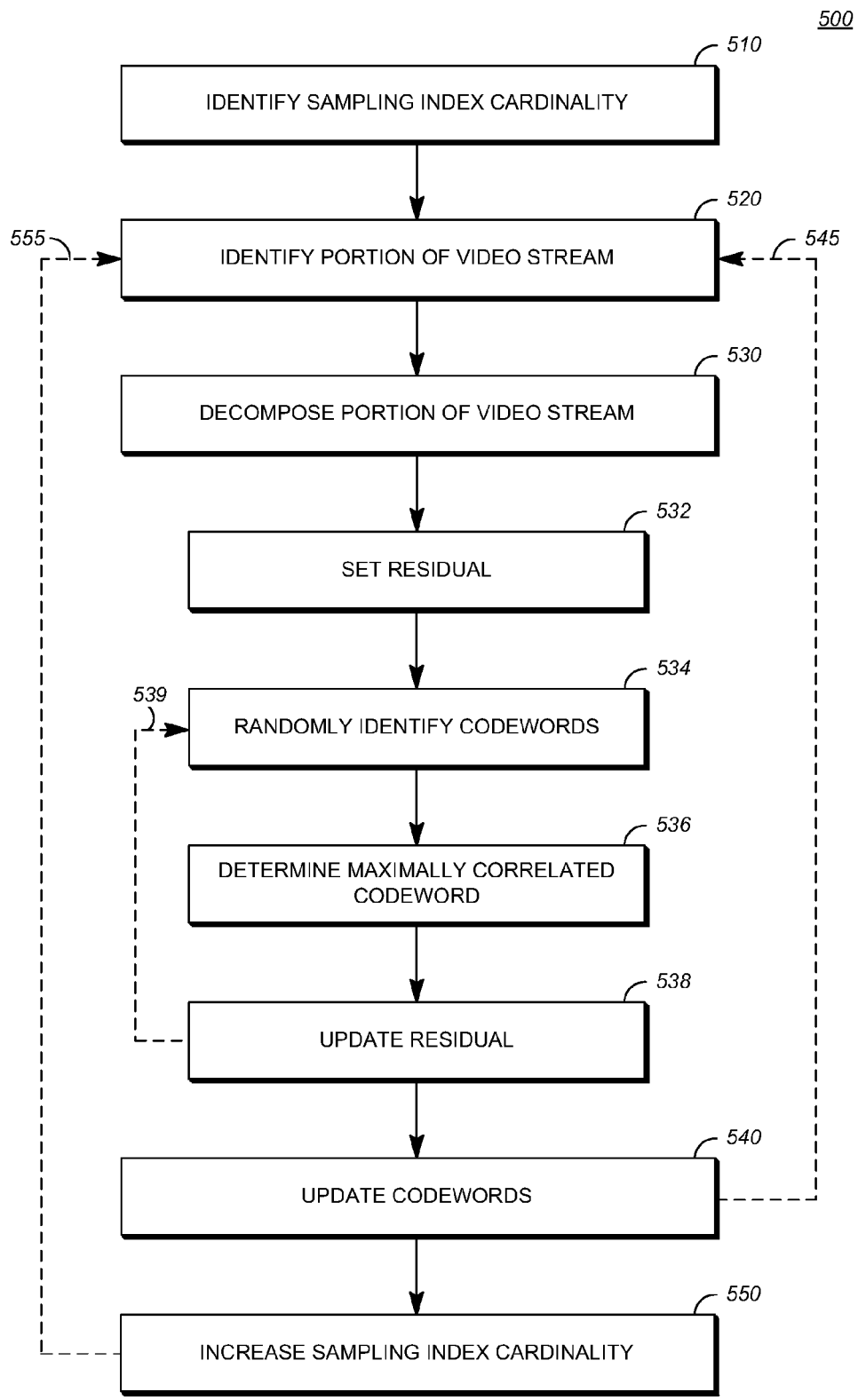
FIG. 5 is a flowchart of sparse coding dictionary priming in accordance with an implementation of this disclosure.

FIG. 5 is a flowchart of sparse coding dictionary priming 500 in accordance with an implementation of this disclosure. The flowchart of FIG. 5 can be used to implement the algorithm above. A device, such as transmitting station 12 or receiving station 30 shown in FIG. 1, may implement sparse coding dictionary priming as disclosed herein using, for example, encoder 70 shown in FIG. 3 and/or decoder 100 shown in FIG. 4. For example, an encoder, such as encoder 70 shown in FIG. 3, can implement sparse coding dictionary priming, or any portion thereof, using instruction stored on a tangible, non-transitory, computer readable media, such as memory 34 shown in FIG. 1.

In an implementation, a dictionary can be a data structure, such as a relational database, that includes a plurality of rows or records. Each record can include an index field and a value field. The index field can include, for example, an integer that indicates as a primary key to dictionary, uniquely identifying each of the rows. The value field can include a value that corresponds mathematically to a component of a video stream portion. The value field can contain a scalar, a vector or array, or a matrix or any other data structure capable of including an indication of a codeword. The values of the dictionary are referred to herein as codewords, and the values can form an over-complete set so that any signal can be recovered by at least one finite weighted sum of the dictionary entries. The codewords may be real numbers that can be normalized so that the sum of their squares equals one.

While the implementation above describes the dictionary as being implemented in the form of a relational database, a dictionary can be implemented in the form of any suitable data structure, such as a list, metadata repository, associative array or any other structure that can store signal elements in a manner that permits the elements to be looked-up, referenced or otherwise accessed such as by using an index value. The term "dictionary" refers to all such structures. Other implementations for looking up codewords (such as hashing of index values) can be used as well and the term "index" refers to all such implementations by which a value can be used to locate a codeword in a dictionary. In an implementation, a dictionary may be stored in memory 16 of transmitting station 12, memory 34 of receiving station 30, or both. For example, transmitting station 12 may store a copy of the dictionary in memory 16 and receiving station 30 may store a matching copy of the dictionary in memory 30.

Starting in FIG. 5, a sampling index cardinality K can be identified at 510. The sampling index cardinality indicates a number of codewords to be selected from the dictionary for each training iteration t. For example, an initial sampling index cardinality of two, which may correspond to a linear sampling distribution, may be identified. The sampling index cardinality may be lower than the cardinality of the dictionary.

A video stream portion can be identified at 520. For example, the video stream portion may include any part or portion of an image or video stream, such as a block, a macroblock, a frame, or an image patch, which may include a number of pixels in close spatial proximity with a target pixel.

The video stream portion can be decomposed at 530. Decomposing the video stream portion can include identifying one or more codewords in the dictionary that most accurately represent the video stream portion. In some implementations, decomposing the video stream portion can include performing matching pursuit, orthogonal matching pursuit, or any other method of decomposing a video stream portion.

In an implementation, decomposing the video stream portion can include iteratively decomposing the video stream portion by identifying a residual at 532, identifying a set of candidate codewords at 534, determining a maximally correlated codeword at 536, and updating the residual at 538. In some implementations, identifying a residual at 532 may include using the value of the video stream portion as the residual value. Identifying a set of candidate codewords at 534 may include stochastically selecting a sampling index cardinality sized subset of the codewords in the dictionary. The candidate codewords may be identified randomly, or pseudo-randomly. In an implementation, determining the maximally correlated codeword at 536 may include determining a correlation between the video stream portion and each respective candidate codeword and selecting the codeword having the greatest correlation. Updating the residual at 536 may include using a difference between the video stream portion and a weighted combination of the identified codewords. As indicated by the broken line at 539, iterations may be performed until the video stream portion is decomposed.

The dictionary may then be updated at 540. For example, the identified codewords may be updated. In certain implementations, the dictionary is primed using the sampling index cardinality for multiple video stream portions as indicated by broken line 545.

The sampling index cardinality may be increased at 550. For example, the sampling index cardinality may be increased in response to an event, such as the expiration of a timer or an iteration counter passing a threshold, which may be a predetermined value. In an implementation, for example, the sampling index cardinality may be increased to three, which may correspond to a quadratic distribution. In an implementation, as indicated by the broken line at 555, the sampling index cardinality may be iteratively increased until the sampling index cardinality reaches the dictionary cardinality. At this time, the process of sparse coding dictionary priming can end.

Other implementations of sparse coding dictionary priming from that shown in FIG. 5 are available. For example, additional elements of sparse coding dictionary priming can be added, certain elements can be combined, and/or certain elements can be removed. Although iterations of sparse coding dictionary priming are described with respect to dictionary training, each video stream portion used for sparse coding dictionary priming may be encoded and transmitted, for example, as shown in FIG. 3. Although not shown in FIG. 5, sparse coding dictionary priming may include transmitting the primed dictionary to a device, such as transmitting station 12 shown in FIG. 1, receiving station 30 shown in FIG. 1, or both.

According to an implementation of sparse coding, an encoder and a decoder may use a dictionary that is predefined, or one that is communicated between the encoder and the decoder. The encoder may encode a portion of a video stream as an index of a codeword in the dictionary and a multiplier (weight), and transmit the index and the multiplier to the decoder. The decoder may determine the codeword based on the received index and may reconstruct the portion of the video steam by multiplying the codeword by the weight. In an implementation, an encoded portion of a video stream may be expressed as a polynomial function. In this case, for example, the portion may be encoded using multiple codewords and corresponding weights.

Generating (initializing) and optimizing (training) a dictionary to improve the accuracy and efficiency of encoding and decoding using the dictionary are described herein. In the implementation of FIG. 5, for example, a sparse coding dictionary may be initialized randomly and may be trained based on multiple video stream portions. In an example of the implementation of FIG. 5, a method of iterative training, such as K-singular value decomposition (K-SVD), may be used.

Decomposing each video stream portion into a sparse combination of codewords in the iterative dictionary training described above may be accomplished using, for example, a greedy method, such as matching pursuit (MP) or orthogonal matching pursuit (OMP). The identified codewords may be updated (trained) based on the video stream portion to more accurately and efficiently represent the video stream portion.

Greedy methods may identify the codeword, or codewords, that have the highest correlation with the video stream portion. For example, a dictionary may include a first codeword that represents a very common image feature and correlates strongly with many video stream portions; and a second codeword that represents a less common feature and correlates strongly with few, or no, video stream portions. The first codeword may have a much higher probability of being trained than the second code word, and the second codeword may not be trained or may be trained very infrequently. Implementations of sparse coding dictionary priming disclosed herein may more efficiently train a dictionary by reducing the probability that one or a few codewords will be untrained or will be infrequently trained.

Soft assignment methods may be used in dictionary training. For example, expectation maximization (EM) calculates a correlation between the video stream portion and each codeword in the dictionary, and weights the codewords based on their respective correlation. Some implementations of dictionary training, such as annealed stochastic EM, may include priming the dictionary. For example, priming a dictionary may include training the dictionary for an initial period, such as a time period, a period based on the number of video stream portions processed, or a period based on the quality of the dictionary, by progressively transitioning from stochastically (random or pseudo-random) assigned weights to correlation based weights. Implementations of sparse coding dictionary priming disclosed herein may more efficiently train a dictionary by priming the dictionary without calculating correlations between each video stream portion and each codeword.

As described above, sparse coding dictionary priming may include priming a sparse coding dictionary based on rank. Priming based on rank may include calculating a correlation between the video stream portion and each respective codeword in the dictionary and assigning each codeword a rank based on correlation. For example, the rank may be assigned such that the highest correlating codeword has a rank of one. Assigning the rank may also include sorting the codewords. Priming based on rank may include selecting a codeword for encoding the video stream portion based on statistically sampling the dictionary such that the sampling distribution may be a function of the rank.

Priming a sparse coding dictionary based on rank may include progressively increasing the number (cardinality) of stochastically selected codewords used for decomposition. For example, decomposition may initially include using a set of two stochastically selected codewords, and the cardinality of the set of selected codewords may be progressively increased until the cardinality of the set of selected codewords equals the cardinality of the dictionary.

The implementations of encoding and decoding described herein illustrate some exemplary encoding and decoding techniques. However, it is to be understood that encoding and decoding, as those terms are used herein may include compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

For simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

Implementations of transmitting station 12 and/or receiving station 30 (and the algorithms, methods, instructions, etc. stored thereon and/or executed thereby, including by encoder 70 and decoder 100) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 12 and receiving station 30 do not necessarily have to be implemented in the same manner.

Further, in one implementation, for example, transmitting station 12 or receiving station 30 can be implemented using a general purpose computer or general purpose processor with a computer program that, when executed, carries out any of the respective methods, algorithms and/or instructions described herein. In addition or alternatively, for example, a special purpose computer/processor can be utilized that can contain other hardware for carrying out any of the methods, algorithms, or instructions described herein.

Transmitting station 12 and receiving station 30 can, for example, be implemented on computers in a real-time video system. Alternatively, transmitting station 12 can be implemented on a server and receiving station 30 can be implemented on a device separate from the server, such as a hand-held communications device. In this instance, transmitting station 12 can encode content using an encoder 70 into an encoded video signal and transmit the encoded video signal to the communications device. In turn, the communications device can then decode the encoded video signal using a decoder 100. Alternatively, the communications device can decode content stored locally on the communications device, for example, content that was not transmitted by transmitting station 12. Other suitable transmitting station 12 and receiving station 30 implementation schemes are available. For example, receiving station 30 can be a generally stationary personal computer rather than a portable communications device and/or a device including an encoder 70 may also include a decoder 100.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method for use in video coding, the method comprising:
   iteratively training a coding dictionary using a processor, wherein the coding dictionary includes a plurality of codewords, by:
   identifying a sampling index cardinality;
   identifying a portion of a video stream;
   decomposing the portion by:

randomly identifying a set of codewords from the plurality of codewords wherein a cardinality of the set of codewords is the sampling index cardinality and wherein the sampling index cardinality is less than a cardinality of the plurality of codewords, and determining a codeword from the set of codewords, the codeword having a maximum correlation with the portion; and updating the codeword based on the portion, wherein the iteratively training the coding dictionary includes increasing the sampling index cardinality in response to an event indicating an expiration of a time period.

2. The method of claim 1, wherein the iteratively training the coding dictionary includes maintaining an iteration counter and the event indicates that the iteration counter crossed a threshold.

3. The method of claim 1, wherein the iteratively training the coding dictionary includes decomposing a plurality of portions of a plurality of video streams including the portion of the video stream.

4. The method of claim 1, further comprising:
generating an encoded video stream by encoding the portion using the codeword; and
transmitting the video stream portion.

5. The method of claim 1, wherein the iteratively training the coding dictionary includes storing the coding dictionary in a non-transitory machine readable medium.

6. The method of claim 1, wherein the iteratively training the coding dictionary includes increasing the sampling index cardinality to equal the cardinality of the coding dictionary.

7. The method of claim 1, further comprising transmitting the coding dictionary to an encoder.

8. The method of claim 1, further comprising transmitting the coding dictionary to a decoder.

9. An apparatus for decoding a frame in a video stream, the frame having a plurality of blocks, the apparatus comprising:
a memory; and
a processor configured to execute instructions stored in the memory to:
iteratively train a coding dictionary, wherein the coding dictionary includes a plurality of codewords, by:
identify a sampling index cardinality;
identify a portion of a video stream;
decompose the portion by:
randomly identifying a set of codewords from the plurality of codewords wherein a cardinality of the set of codewords is the sampling index cardinality and wherein the sampling index cardinality is less a cardinality of the plurality of codewords, and
determining a codeword from the set of codewords, the codeword having a maximum correlation with the portion; and
update the codeword based on the portion,
wherein iteratively training the coding dictionary includes maintaining a timer and increasing the sampling index cardinality in response to an event indicating an expiration of the timer.

10. The apparatus of claim 9, wherein the processor is configured to iteratively train the coding dictionary by maintaining an iteration counter and the event indicates that the iteration counter crossed a threshold.

11. The apparatus of claim 9, wherein the processor is configured to iteratively train the coding dictionary by decomposing a plurality of portions of a plurality of video streams including the portion of the video stream.

12. The apparatus of claim 9, wherein the processor is configured to:
generate an encoded video stream by encoding the portion using the codeword; and
transmit the video stream portion.

13. The apparatus of claim 9, wherein the processor is configured to store the coding dictionary in a non-transitory machine readable medium.

14. The apparatus of claim 9, wherein the processor is configured to iteratively train the coding dictionary by increasing the sampling index cardinality to equal the cardinality of the coding dictionary.

15. The apparatus of claim 9, wherein the processor is configured to transmit the coding dictionary to an encoder.

16. The apparatus of claim 9, wherein the processor is configured to transmit the coding dictionary to a decoder.

17. The method of claim 1, wherein determining a codeword from the set of codewords comprises:
for each codeword of the set of codewords, determining a correlation between the portion of the video stream and the codeword; and
selecting the codeword of the set of codewords having the maximum correlation with the portion of the video stream.

18. The method of claim 1, wherein updating the codeword based on the portion comprises:
updating the codeword based on a difference between the portion and a weighted combination of the set of codewords.

19. The apparatus of claim 9, wherein the processor is configured to determine a codeword from the set of codewords by:
for each codeword of the set of codewords, determining a correlation between the portion of the video stream and the codeword; and
selecting the codeword of the set of codewords having the maximum correlation with the portion of the video stream.

20. The apparatus of claim 9, wherein the processor is configured to update the codeword based on the portion by:
updating the codeword based on a difference between the portion and a weighted combination of the set of codewords.

* * * * *